United States Patent [19]

Kremer et al.

[11] Patent Number: 5,390,397

[45] Date of Patent: Feb. 21, 1995

[54] RETAINING SYSTEM

[75] Inventors: Richard L. Kremer, White Lake; Mark J. Jacobson, New Hudson, both of Mich.

[73] Assignee: Nissan Research and Development, Inc., Farmington Hills, Mich.

[21] Appl. No.: 89,181

[22] Filed: Jul. 12, 1993

[51] Int. Cl.⁶ .................... A44B 17/00; F16B 21/00
[52] U.S. Cl. .......................... 24/662; 24/351; 24/710.5; 411/517
[58] Field of Search ............ 24/662, 351, 710.5, 24/90.5; 248/217.2; 411/338, 339, 512, 525, 526, 14, 517, 544

[56] References Cited

U.S. PATENT DOCUMENTS

| | | | |
|---|---|---|---|
| 543,090 | 7/1895 | Harris | 24/710.5 |
| 1,265,719 | 5/1918 | Anderson | 24/662 |
| 1,412,970 | 4/1922 | Salfisberg | 24/710.5 |
| 1,486,315 | 3/1924 | Wiley | 24/662 |
| 2,174,521 | 10/1939 | Lancaster | 411/339 |
| 5,093,958 | 3/1992 | Levine | |
| 5,148,581 | 9/1992 | Hartmann | |

FOREIGN PATENT DOCUMENTS

| | | | |
|---|---|---|---|
| 0360591 | 4/1906 | France | 24/662 |
| 0282171 | 7/1952 | Switzerland | 411/517 |
| 0016365 | of 1911 | United Kingdom | 24/662 |
| 0614283 | 12/1948 | United Kingdom | 411/517 |

Primary Examiner—Victor N. Sakran
Attorney, Agent, or Firm—Foley & Lardner

[57] ABSTRACT

The present invention is a retaining system for an automotive carpet, such as a floor mat. The system consists of a tapered pin; and two washers. The assembly process consists of snap-fitting a first washer over a separate decorative pin, or a tapered pin. The second washer is then snap-fitted into an annular channel formed between two tabs on the first washer. The completed assembly then secures an automotive carpet at an appropriate location.

13 Claims, 3 Drawing Sheets

RETAINING SYSTEM

BACKGROUND OF THE INVENTION

This invention relates to a retaining system especially a system used for an automotive carpet. In conventional retaining systems in automotive applications, snap-ring fasteners and tinnerman nuts are one of several tools used to secure carpeting. Sometimes washers are used to assist in securing the carpet. These washers can be made out of a metal such as steel, and can have relief notches and tabs. The notches allow the washer to deflect, while the tabs are important to allow for flexibility.

Nowadays, clip devices are used as another tool to maintain an article which can be releasably removed, such as carpeting covering the floor boards in an automobile. U.S. Pat. No. 5,148,581 shows one example of a clip used primarily to secure an automobile floor mat to carpeting. However, the insertion member of the clip used to secure the clip to the carpet slides away from the carpet after only a relatively short exposure from forces exerted on the floor mat from an individual's feet or shoes. Therefore, the retention force is not large enough to prevent slippage.

In prior U.S. Pat. No. 5,093,958, a strap, connected to the underside of a floor mat, has an adjustable buckle and strap extension which is attached to an elongated "S"-shaped clip. One end of the clip is forced over the exposed edge of the automobile's original carpeting to hold the floor mat in a securely held place. However, a hook and clip requires additional clearance from the end of the mat to the point where a pin is inserted into the carpeting, thereby requiring the mat to sit in an unnatural position which may not be aesthetically pleasing to an occupant. Also, the cost of this system may be prohibitive depending on the materials used.

While these designs have achieved commercial success, some improvements have been desired to provide a more aesthetically pleasing, simple to use, and cost-effective retaining system, which can experience greater retention forces without unfastening.

SUMMARY OF THE INVENTION

The primary object of this invention is to provide an improved retaining system. Another object of this invention is to allow for an installation force to be 1/15 (one-fifteenth) to 1/20 (one-twentieth) of the retention strength of the pull-off force. Furthermore, this invention has another object to provide an improved retaining system in which a separate tapered pin with a decorative head could be used as a fastener in other fastener applications.

To achieve the aforementioned objects, this invention basically includes a pin, which can be a separate pin with a decorative head, or a molded-in pin in any attached surface; and at least two washers.

DETAILED DESCRIPTION OF THE PREFERRED EMBODIMENT (S)

Figure 1:
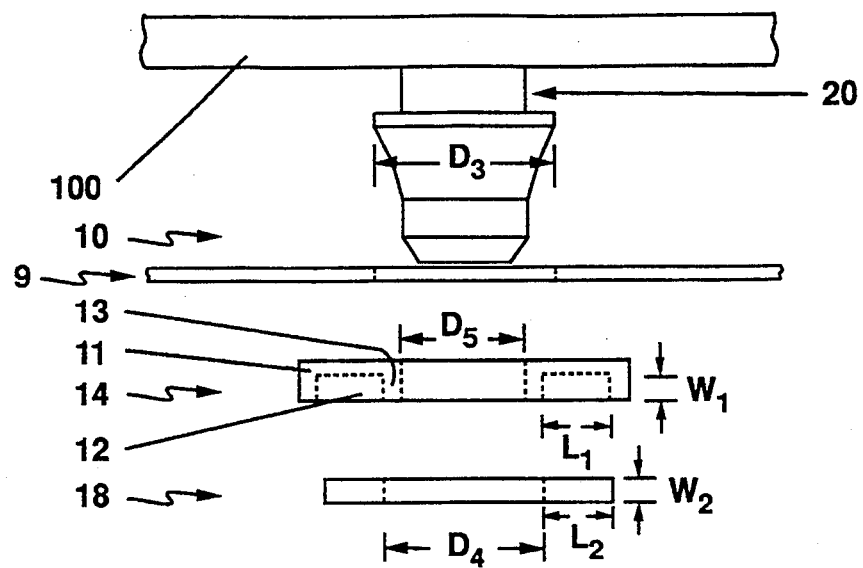
FIG. 1 is an exploded side view showing a molded-in pin and washers before assembly.

In FIG. 1, a tapered pin 10 which was formed with a carpet 100, a first washer 14, a second washer 18, and a floor panel 9 are shown. An annular channel 12 is formed between two annular tabs located on the first washer. The outer tab 11 is located at the outside diameter of the first washer, while the inner tab 13 is located at the inside diameter of the first washer. The depth of the channel is "$W_1$," and is equal to the thickness "$W_2$" of the second washer. ("$W_1$"="$W_2$") The width of the channel is "$L_1$," and is slightly larger than the width "$L_2$," of the second washer. ("$L_2$"<"$L_1$") The diameter of the largest tapered end of pin 10 is "$D_3$" The inner diameter of the second washer 18 is "$D_4$," and is larger than the inner diameter "$D_5$" of the first washer 14. ("$D_4$">"$D_5$") Also, in order to prevent the second washer 18 from falling out from the channel 12, the diameter "$D_3$" is larger than the inner diameter "$D_4$" of the second washer 18. ("$D_3$">"$D_4$">"$D_5$") Thus, the larger diameter "$D_3$" of pin 10 aids in preventing the second washer 18 from falling out of the first washer's channel 12. Both washers are made of a rigid plastic, preferably an acetyl resin. However, other rigid plastics, such as nylon, polypropylene, or acrylonitrile butadiene styrene (ABS) could be used. Polypropylene could be used for lowest cost.

Figure 2:
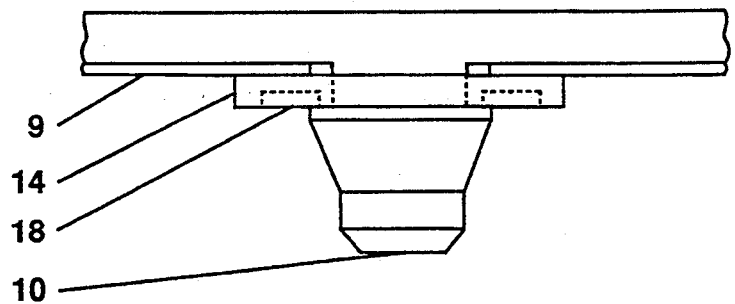
FIG. 2 is a side view of the final positions of the first washer with the second washer.
Figure 3:
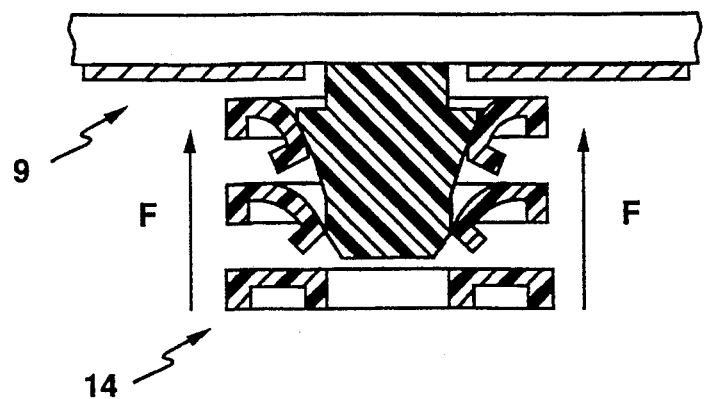
FIG. 3 is a sectional view showing three separate positions of the assembly process of the first washer being snap fitted over the tapered pin
Figure 4:
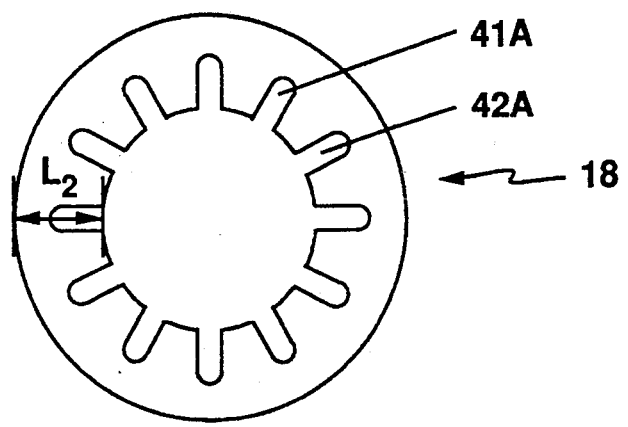
FIG. 4(A) is a plan view of the second washer.
FIG. 4(B) is a plan view of the first washer.
Figure 4:
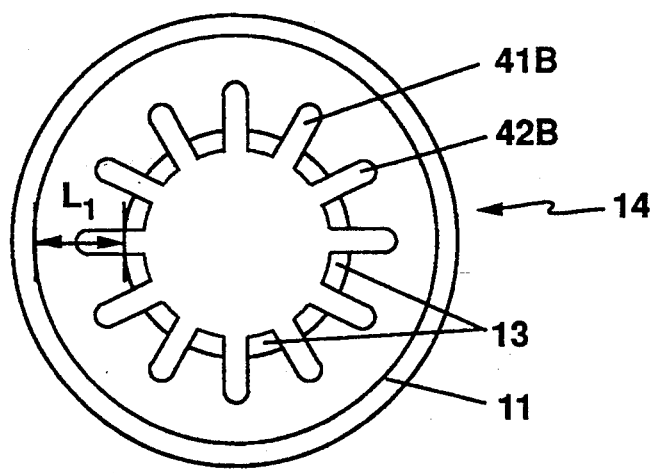
Figure 5:
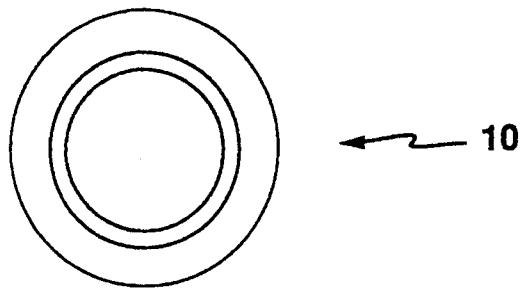
FIG. 5 is a plan view of the tapered pin.

In assembling the retaining system, as shown in FIG. 2 and FIG. 3, a force F is applied to the first washer 14 which pushes washer 14 over pin 10 until tabs 13 engage with the underside 20 of the tapered pin. Several relief notches found on the first washer, such as 41(B) and 42(B) as seen in FIG. 4(B), allow resilient tabs 13 to deflect to the point where their diametrical value is equal to the diameter "$D_3$" of the pin. Once the tabs have deflected sufficiently to enable installation on the underside 20 of the tapered pin, then tab 13 snaps back into its previous position.

The second washer 18, as seen in FIG. 2 and 4(A), is similarly installed, and the resilient tab deflection concept with similar relief notches 41(A) and 42(A), is the same as in the first washer. The second washer serves to prevent the tabs on the first washer from deflecting to the point where the first washer could be removed axially, so as to keep the width "$L_1$," between the outer tab 11 and the inner tab 13 of the first washer, from decreasing. For example, if the second washer was not provided and a point stress such as from a high-heel shoe presses against or near the pin, then the internal edge of the inner tab 13 will deform, and eventually the opposite edge of inner tab 13 will "pop-off" the pin. This is the reason why the width "$L_1$" must be retained by using the second washer to prevent the width "$L_1$" from decreasing.

Adding the second washer creates pulloff or retention values which are dramatically increased approximately fifteen (15) to twenty (20) times greater than the total installation forces. The total installation forces consist of each installation force for the first washer and the second washer. Since the first washer and the second washer are installed separately, and each installation force is based upon the thickness of each washer, the total installation forces are not so large. However, once these washers are installed, it is impossible to pull them off separately because there is not enough space to insert an object to remove only the second washer 18 from channel 12. Therefore, both washers could be considered as one-piece having a larger thickness, so the pull-off or retention values are dramatically increased. These values are necessary in order to let washers 14 and 18 remain below the underside 20 of pin 10 and secure the carpet 100 for extended periods of time. Also, the addition of the outer tab 11 on the first washer 14 is necessary since it defines the width of channel "$L_1$," and is there to prevent flexibility of the first washer 14 when the second washer 18 is positioned inside channel 12.

Figure 6:
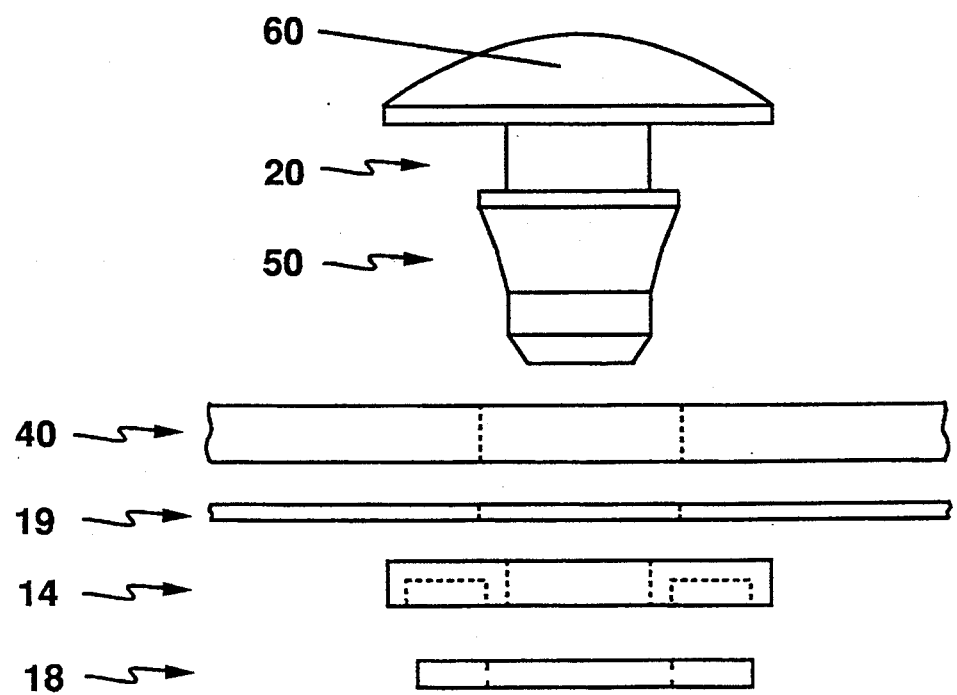
FIG. 6 is an exploded side view showing a separate tapered pin with a decorative head and washers before assembly.

The preferred embodiment described above uses a molded-in pin. However, this invention is not restricted to the above embodiment but encompasses other embodiments. For example, as seen in FIG. 6, a separate pin 50 with a decorative head 60, and two washers 14 and 18, secures other attached parts, like a carpet 40 with an underpad 19, which could be used in another fastener application. This embodiment not only uses the same concepts as in the first embodiment, but is more aesthetically pleasing, since a tapered pin molded-in with an attached part such as carpeting 100 may not lay flat or be flush with the floor of a vehicle. A separate pin with a decorative head may provide this aesthetic quality.

What is claimed is:

1. A retaining device comprising:
   a tapered pin formed with at least one attached part;
   a first washer with an annular channel formed on one side of said first washer, said first washer engaging with an underside of said tapered pin for securing at least one other part between the other side of said first washer and said attached part; and
   a second washer engaging with said underside of said tapered pin and positioned inside said annular channel of said first washer.

2. A retaining device as set forth in claim 1, wherein the largest diameter of said pin is greater than the inside diameter of said second washer.

3. A retaining device as set forth in claim 1, wherein said first washer contains relief notches extending radially from an inside diameter to an outside diameter of said first washer, for providing a snap-fit of said first washer to said pin, and inner tabs located at the inside diameter for engaging with said underside of said tapered pin.

4. A retaining device as set forth in claim 3, wherein said second washer contains relief notches extending radially from an inside diameter to an outside diameter of said second washer, for providing a snap-fit of said second washer to said pin.

5. A retaining device as set forth in claim 1, wherein said washers are composed of rigid plastic.

6. A retaining device as set forth in claim 5, wherein said rigid plastic comprises an acetal resin.

7. A retaining device comprising:
   a pin with a decorative head on one side thereof and on the other side thereof a tapered portion; and
   a first washer with an annular channel formed on one side of said first washer, said first washer engaging with an underside of said tapered portion for securing at least one part between the other side of said first washer and said decorative head of said pin; and
   a second washer engaging with said underside of said tapered portion and positioned inside said annular channel of said first washer.

8. A retaining device as set forth in claim 7, wherein the largest diameter of said tapered portion is greater than the inside diameter of said second washer.

9. A retaining device as set forth in claim 7, wherein said first washer contains relief notches extending radially from an inside diameter to an outside diameter of said first washer, for providing a snap-fit of said first washer to said pin, and inner tabs located at the inside diameter for engaging with said underside of said tapered portion.

10. A retaining device as set forth in claim 9, wherein said second washer contains relief notches extending radially from an inside diameter to an outside diameter of said second washer, for providing a snap-fit of said second washer to said pin.

11. A retaining device as set forth in claim 7, wherein said washers are composed of rigid plastic.

12. A retaining device as set forth in claim 11, wherein said rigid plastic comprises an acetal resin.

13. A method for securing one part to another part with a pin having a decorative head on one side thereof and on the other side thereof a tapered portion comprising the steps of:
   pushing a first washer with an annular channel formed on one side of said first washer over said tapered portion of said pin to engage with an underside of said tapered portion and secure one part between the other side of said first washer and said decorative head; and then
   pushing a second washer into said annular channel of said first washer to engage with the underside of said tapered portion.

* * * * *